United States Patent
Degler

(10) Patent No.: US 8,033,370 B2
(45) Date of Patent: Oct. 11, 2011

(54) DEVICE TO DAMPEN VIBRATIONS, ESPECIALLY A TORSIONAL VIBRATION DAMPER AND FORCE TRANSMISSION DEVICE

(75) Inventor: Mario Degler, Baden-Baden (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 512 days.

(21) Appl. No.: 12/214,096

(22) Filed: Jun. 17, 2008

(65) Prior Publication Data

US 2008/0314710 A1    Dec. 25, 2008

(30) Foreign Application Priority Data

Jun. 18, 2007  (DE) .................. 10 2007 027 911

(51) Int. Cl.
*F16H 45/02* (2006.01)
*F16F 15/123* (2006.01)

(52) U.S. Cl. ....... 192/3.3; 192/70.17; 192/206; 192/212

(58) Field of Classification Search .............. 192/206, 192/55.2–55.4, 55.61, 207, 208; 464/161
See application file for complete search history.

(56) References Cited

U.S. PATENT DOCUMENTS

| | | | |
|---|---|---|---|
| 4,418,812 A * | 12/1983 | Lech, Jr. ................. | 192/206 |
| 4,583,959 A | 4/1986 | Yoneda | |
| 4,867,290 A * | 9/1989 | Macdonald et al. ......... | 192/3.28 |
| 4,911,278 A * | 3/1990 | Kabayama et al. ........... | 192/207 |
| 4,993,530 A * | 2/1991 | Maki ........................ | 192/213.22 |
| 5,813,505 A | 9/1998 | Olsen et al. | |
| 2003/0178757 A1 | 9/2003 | Rohs et al. | |
| 2004/0112698 A1* | 6/2004 | Maienschein ................ | 192/3.23 |

FOREIGN PATENT DOCUMENTS

| | | |
|---|---|---|
| DE | 3333536 | 3/1984 |
| DE | 19626685 | 1/1997 |
| DE | 10017688 | 10/2001 |

* cited by examiner

*Primary Examiner* — Richard M. Lorence
(74) *Attorney, Agent, or Firm* — Simpson & Simpson, PLLC

(57) ABSTRACT

A device for damping vibrations, especially a torsional vibration damper, comprising at least one primary part and a secondary part that are coaxial in relation to each other and limited rotatably relative to each other in a peripheral direction, whereby the primary part and secondary part (4) are coupled with each other by a vibration damper, and the secondary part can be at least indirectly coupled to a connecting element, especially a transmission input shaft. A ramp is provided that is at least indirectly connected to the secondary part, extends in a peripheral direction over a section, has an axially changing slope and acts on at least one counter element braced against a connecting element via a pretensioning unit.

16 Claims, 6 Drawing Sheets

DEVICE TO DAMPEN VIBRATIONS, ESPECIALLY A TORSIONAL VIBRATION DAMPER AND FORCE TRANSMISSION DEVICE

CROSS REFERENCE TO RELATED APPLICATIONS

This patent claims priority of German Patent Application No. 10 2007 027 911.8, filed Jun. 18, 2007, which application is incorporated herein by reference.

FIELD OF THE INVENTION

The invention relates to a device for damping vibrations, especially a torsional vibration damper, comprising a primary part and a secondary part that are coaxial in relation to each other, limited rotatably relative to each other in a peripheral direction, and are coupled with each other by means for transmitting torque and damping vibrations. The invention also relates to a force transmission device.

BACKGROUND OF THE INVENTION

Numerous designs of devices to dampen vibrations are known in the prior art. Depending on the type of damping employed, these are based on mechanical damping, especially friction damping, or hydraulic damping, or a combination of types of damping such as mechanical and hydraulic. In the case of mechanical damping devices, the torque is transmitted and the damping is coupled by means of spring units, especially in the form of arc springs or coil springs that are between the primary part and secondary part and alternately support them, and by means of which the peripheral rotatability is generated by applying and changing the pretension. The level of transmittable torque and the level of possible damping greatly depend on the number and dimensions of these spring units. In particular, the windup angle between the primary part and secondary part cannot be substantially increased without correspondingly designing the spring units which, however, may necessitate substantially increasing the required construction space in certain circumstances. In addition, the spring units dictate a specific damper characteristic.

So-called ramp dampers are therefore frequently used as for example known from DE 196 26 685. With these, the rotation of the primary part in relation to the secondary part is generated by peripheral ramps rising in an axial direction with intermediate rolling elements, especially balls, and one part is axially displaced in relation to the other part, especially the primary part in relation to the secondary part, and the primary part abuts a spring unit. By means of this displacement, corresponding damping is generated when the balls contact the corresponding elements on either side.

Other ramp damping arrangements are in particular described in DE 100 17 688 A1. This discloses numerous devices for damping vibrations in the form of so-called ramp dampers in which a spring element is provided for the sake of simplification that has a spring leaf, and that interacts with a least one rolling element in a first contact area. In a second contact area opposite the first contact area of the spring leaf, the rolling body acts against a stop. The stop and spring leaf are movably mounted relative to each other. The spring leaf is bent during such a relative movement. The entire spring element can therefore be assembled from a few components that are extremely economical to manufacture. The spring element can be created within a small, axial envelope, and it can be combined with a wide range of damping devices. As mentioned, the individual rolling elements are guided in peripheral recesses that are characterized by different axial slopes.

Another damping device is known from DE 33 33 536, which is combined with a conventional damping device, and is additionally provided with a friction device axially arranged between itself and the flange, which consists of an axially acting spring device with a tongue design for a non-rotating connection, and an axially adjacent friction plate that is nonrotatably connected with the neighboring parts (flange and side plates), wherein the spring device is designed as a wavy, axially curved flat-form spring to generate a windup angle-dependent axial application of spring pressure, said flat-form spring abutting the friction plate with axially rising surfaces, and the spring device having a closed annular wave spring with a plurality of waves, wherein the shape of the surface of the friction plate facing the wave spring corresponds to the waviness of the abutting wave spring. The tongue design for the nonrotating connection of the wave spring within the inner perimeter of the flange is characterized by an axially curved tongue that nonrotatably engages in a window for a torsional spring.

Embodiments of devices for damping vibrations with arc springs or spiral springs are characterized in that the windup angle is relatively limited. Embodiments in ramp form are limited by the peripheral extension of the ramp and their dimensions.

BRIEF SUMMARY OF THE INVENTION

The invention is therefore based on the problem of extending the potential windup angle of the conventional damper, especially with spiral or arc springs at a given torque within specific ranges of the torsion damper characteristic, or to reduce the spring gradient in these ranges.

According to the invention, the device to dampen vibrations with a primary part and a secondary part that are coaxial in relation to each other, limited rotatably relative to each other in a peripheral direction, and coupled with each other by means for damping vibrations and means for spring coupling are characterized in that an axially acting ramp at least indirectly connected to a secondary part is provided that acts axially on at least one counter element that abuts a connecting element via at least one pretensioning unit, especially a spring unit. By combining the ramp with a conventional vibration damping system according to the invention, especially in the form of coupling the primary part with the secondary part by the means for damping vibrations in the form of spring units, such as spiral or arc springs, the springs can be designed smaller in regard to spring gradient since the excess is dampened by means of the ramp. In the solution according to the invention, the damping components are therefore combined differently, and the damping component can be shifted by the design of the two systems and have an effect within a specific damper characteristic.

The connection of the secondary part with the ramp can be made with a flange. The flange can be non-rotatably connected to a hub with peripheral play to limit a specific windup angle, said hub being connectable by means of a connecting element for the secondary part, in particular, for example, a transmission input shaft. The flange can be designed as an integral component with the secondary part to concentrate the function. In this case, the secondary part is preferably designed as a molded part whose surface is correspondingly processed to incorporate the ramp, or as a cast part.

In another embodiment, it is also conceivable to fixedly couple the flange as a separate element to the secondary part using corresponding connecting means. In this case, conventional secondary components can also easily be provided afterward with such ramps.

To achieve a greater concentration of functions and components, the ramp function is preferably directly assumed by the flange. The flange can comprise a single part or multiple parts.

The counter element can be guided in a friction bearing or roller bearing. The friction-bearing-guided elements are usually characterized by requiring minimal construction space in an axial direction. The advantage of using roller-bearing-guided elements is reduced friction. The counter elements can for example be conventional ball bearings or cylindrical roller bearings.

These embodiments analogously apply to the other functional units such as spring units. These can either be designed as diaphragm springs or, for example, compression springs. The specific selection lies within the discretion of the responsible expert. For example, a specific spring behavior and spring characteristic can be achieved by the shape, dimensions, and design of the individual diaphragm springs, whereas these features are relatively inflexible with compression springs.

The support element can be directly formed by the hub or the transmission input shaft. In this case, a correspondingly radially aligned collar can be provided that forms an axial contact surface for the respective spring element. The hub can be designed as a single part or multiple parts, or another fixed element can optionally be used.

The damping rate for the entire system can be influenced within certain limits by the design of the individual components forming the ramp, and the connection elements and slope of the ramp. A continuous linear characteristic can preferably be achieved by the ramp over the entire damping range.

The solution according to the invention is particularly useful in force transmission devices with a hydrodynamic and mechanical transmission branch for use in motor vehicles. In motor vehicles, such a device is, for example, downstream in the direction of force from a device for circumventing a hydrodynamic power branch.

The ramp function can be realized according to the invention either on one side or both sides of the ramp viewed in an axial direction. In each case, support against at least one axial stop is required.

BRIEF DESCRIPTION OF THE DRAWINGS

The solution according to the invention will be explained below with reference to the figures. In particular, the following is portrayed.

DETAILED DESCRIPTION OF THE INVENTION

Figure 1:
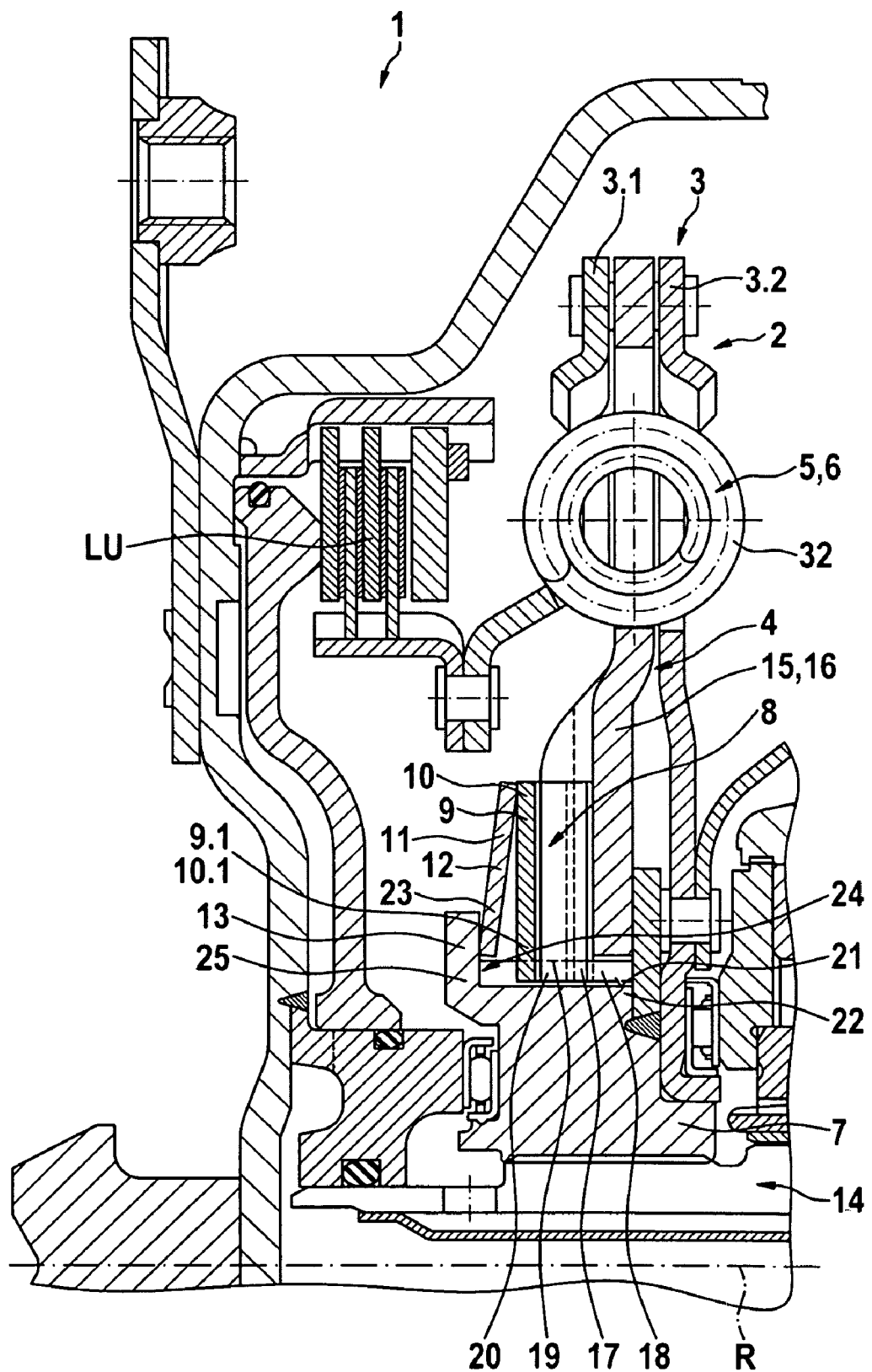
FIG. 1 schematically illustrates a device designed according to the invention to dampen vibrations in an axial section of a section of a force transmission device.

FIG. 1 schematically illustrates the basic design of a device 2 according to the invention for damping vibrations, especially a torsion vibration damper, in a section of a force transmission device 1. This device comprises a primary part 3 and a secondary part that are coaxial in relation to each other and limited rotatably relative to each other in a peripheral direction. Primary part 3 and secondary part 4 can be designed as a single part or multiple parts. In the portrayed case, primary part 3 consists for examples of two disc-shaped elements 3.1, 3.2 at an axial distance from each other that receive secondary part 4. Primary part 3 and secondary part 4 are coupled to each other by means 5 for transmitting torque, and means 6 for damping vibrations. The function of means 5 for transmitting torque can be partially assumed by means 6 for damping vibrations. Device 2 for damping vibrations functions as an elastic coupling, i.e., it transmits torque and simultaneously compensates vibrations. Primary part 3 can be coupled at least indirectly in force transmission device 1 to an output machine (not shown), whereas secondary part 4 is connected to a power takeoff that for example is formed by a transmission input shaft of a gearbox unit downstream from the force transmission device. In the portrayed case, secondary part 4 is coupled to a transmission input shaft 14 via a hub 7, the mid-axis of device 2 for damping vibrations thereby coincides with rotational axis R up the shaft and also corresponds to the rotational axis R of force transmission device 1. With the direction of force flowing from an output machine to a power takeoff, primary part 3 functions as the input part, and secondary part 4 functions as the output part. Means 5 for transmitting torque and means 6 for damping vibrations can be designed differently. The portrayed embodiment is preferably a purely mechanical damper, whereas means for transmitting torque 5 is formed by means for damping vibrations 6 in the form of spring units 32. Secondary part 4 is at least indirectly connected to a power takeoff, hub 7 in the present case. A ramp 8 is used for coupling. Ramp 8 extends over at least a portion viewed in the peripheral direction of secondary part 4, and rises in an axial direction, i.e., ramp 8 is formed by an axial projection which increases axially viewed in a peripheral direction and rises or falls when viewed in a peripheral direction. Due to ramp 8, a counter element 9 such as a ramp plate 10 is deflected in an axial direction with reference to the rotational axis R when rotated in a peripheral direction. The path of the axial movement of counter element 9 is limited by a pretensionable unit 11, especially a spring element 12. Pretensionable unit 11 abuts a connecting element 13. Connecting element 13 is preferably the power takeoff that already exists, or hub 7 non-rotatably coupled to transmission input shaft 14. A flange 15 is used to couple to ramp 8, said flange preferably being designed as a single part with secondary part 4. Flange 15 is preferably designed as a single part plate element 16. In FIG. 1, the function of ramp 8 is integrated in flange 15. Flange 15 is fixedly coupled to hub 7 with play in the peripheral direction. The connection is provided by toothed elements 17 on a section 20 of flange 15 forming an inner perimeter 19, and on toothed elements 18 on a section 22 forming an outer perimeter 21 of hub 7. The teeth are designed so that they permit play in the peripheral direction between flange 15 and hub 7 to limit a specific windup angle for example 5°.

Counter element 9 in FIG. 1 is designed as a friction bearing element 9.1, and forms a ramp plate 10.1. In an axial direction, this abuts secondary part 4 in the area of hub 7 and is fixedly connected to hub 7, however, movably guided in an axial direction so that, when secondary part 4 rotates in relation to primary part 3 from the introduction of torque, the torque is transmitted via ramp 8 to counter element 9. The counter element has a surface parallel to ramp 8. In other words, the face-side teeth (similar to serration) of counter element 9 engage in the profile of ramp(s) 8, and the surfaces slide on each other when they execute relative movements.

Spring element 12 is designed as a diaphragm spring 23 on one side, and abuts hub 7 so that counter element 9 is supported against hub 7 in the axial direction. Hub 7 includes a radially-aligned collar 25, which forms an axial contact surface 24 for spring 12.

FIG. 1 illustrates a fundamental possibility. Other embodiments are conceivable.

Figure 2:
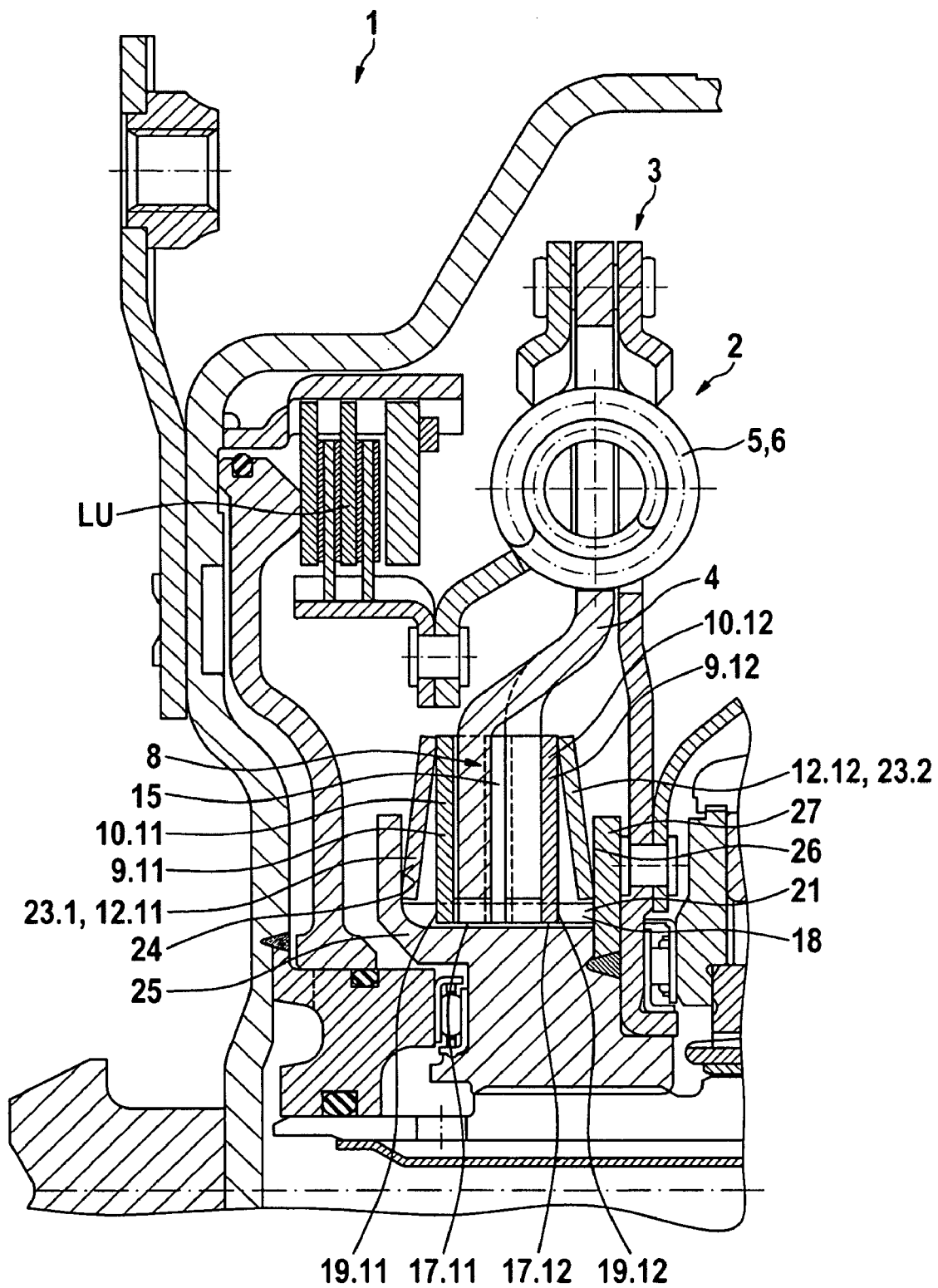
FIG. 2 illustrates a development of FIG. 1.

FIG. 2 illustrates a development of the embodiment in FIG. 1 with two counter element 9.11, 9.12 in the form of ramp plates 10.11 and 10.12 that are on both sides of flange 15. Ramp plates 10.11 and 10.12 also have teeth 17.11, 17.12 on their inner perimeter 19.11 and 19.12, that interact with complementary teeth 18 on outer perimeter 21 hub 7. Both ramp plates 10.11, 10.12 are also fixedly connected to hub 7 and are movably guided in an axial direction. The support is provided on both sides, i.e., each ramp plate 10.11 and 10.12 at least indirectly abuts hub 7 via a spring element 12.11 and 12.12 preferably in the form of a diaphragm spring 23.1 and 23.2. In this case as in FIG. 1 with regard diaphragm spring 23.1, the ramp plates abut a radially aligned collar 25 forming an axial contact surface 24 on hub 7, and an axial contact surface 26 on a non-rotatable disc-shaped element 27 connected to hub 7 for example by interlocking material. In the remaining design and function corresponds to the embodiment in FIG. 1 which is why the same reference numbers are used for the same elements.

Figure 3:
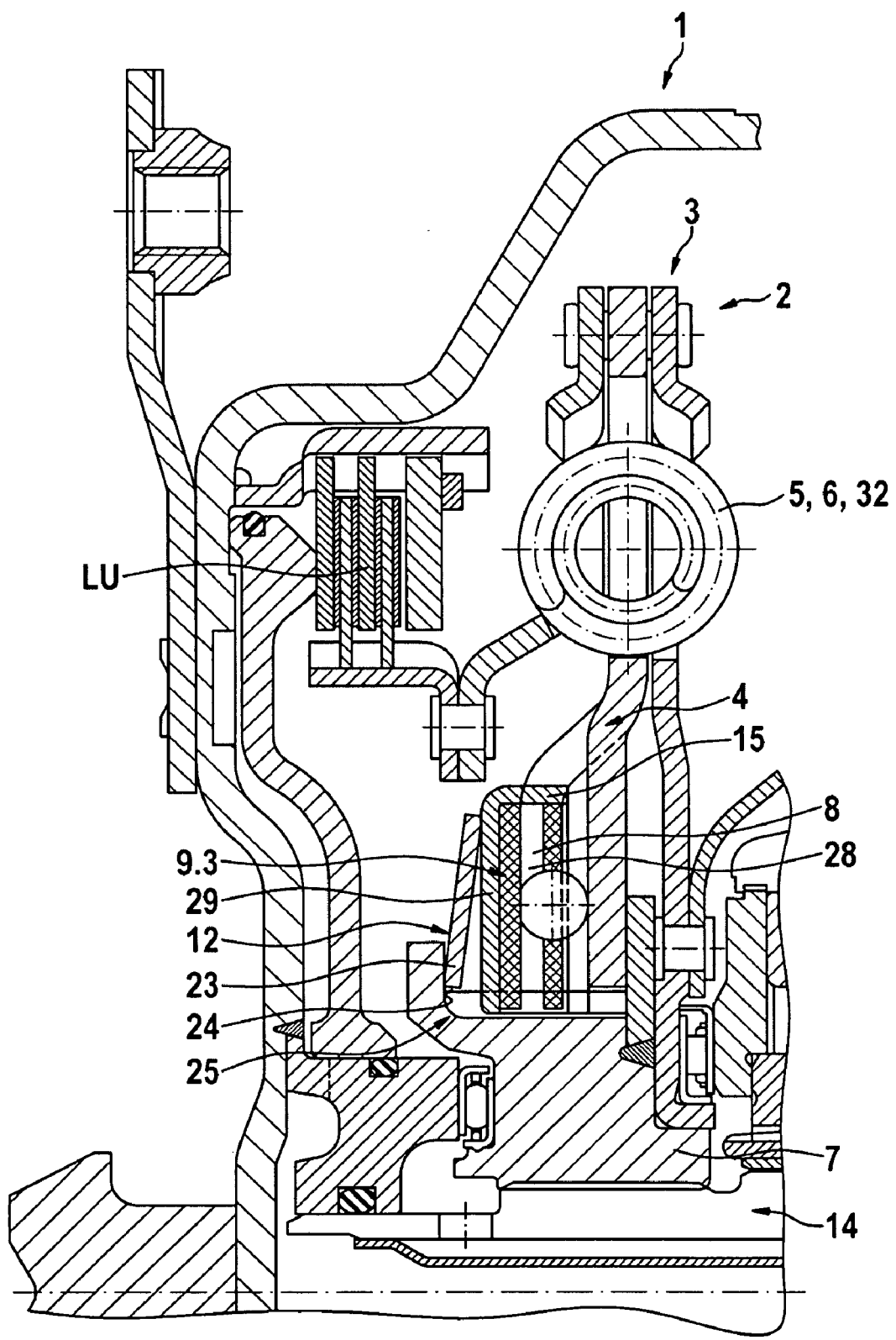
FIG. 3 illustrates an embodiment of FIG. 1 with a roller-bearing-mounted counter element.

FIG. 3 illustrates a development of FIGS. 1 and 2. The basic design corresponds to the one described in FIG. 1, which is why the same reference numbers are used for the same elements. In FIG. 3, counter element 9.3 is designed as a roller bearing element. Instead of the ramp plate, a combination of a ball bearing 28 and plate element 29 is used, and ball bearing 28 is between ramp 8 and plate element 29 to form counter element unit 9.3. Counter element 9.3 is supported by spring unit 12 which is preferably also designed as diaphragm spring 23 that abuts axially aligned surface 24 on collar 25 of hub 7.

Figure 4:
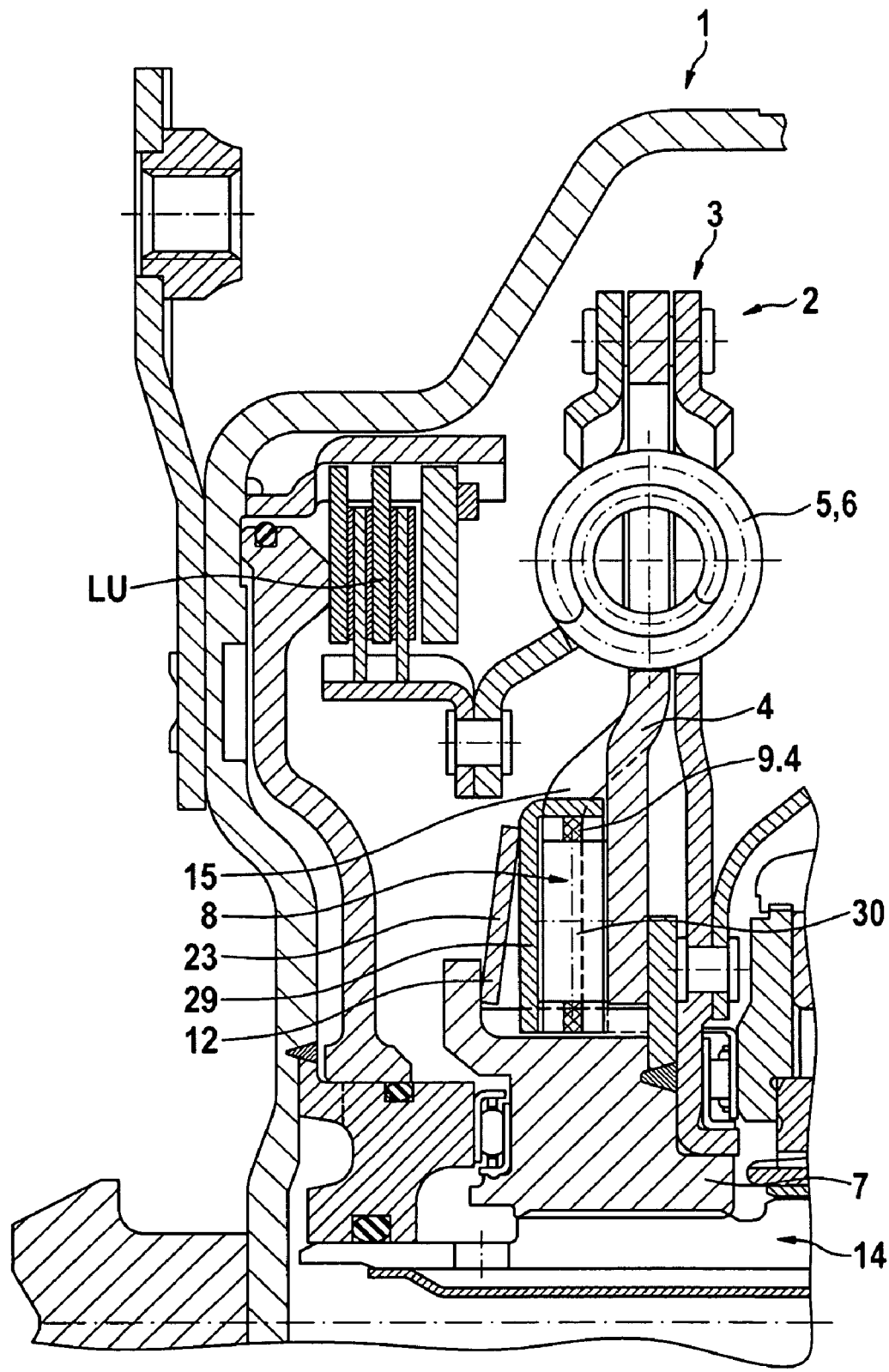
FIG. 4 illustrates an embodiment of FIG. 3 with a cylindrical roller bearing.

FIG. 4 illustrates an embodiment of FIG. 3, whereby a counter element unit 9.4 does not comprise ball bearing 28 but rather a cylindrical roller bearing 30. The basic design corresponds to the design described for FIG. 3.

FIGS. 3 and 4 both show the one-sided arrangement of counter element units 9.3 and 9.4. It is however also conceivable to arrange the cited counter elements or counter element units 9.3, 9.4 on both sides of flange 15 or ramp 8 analogous to FIG. 2.

Figure 5:
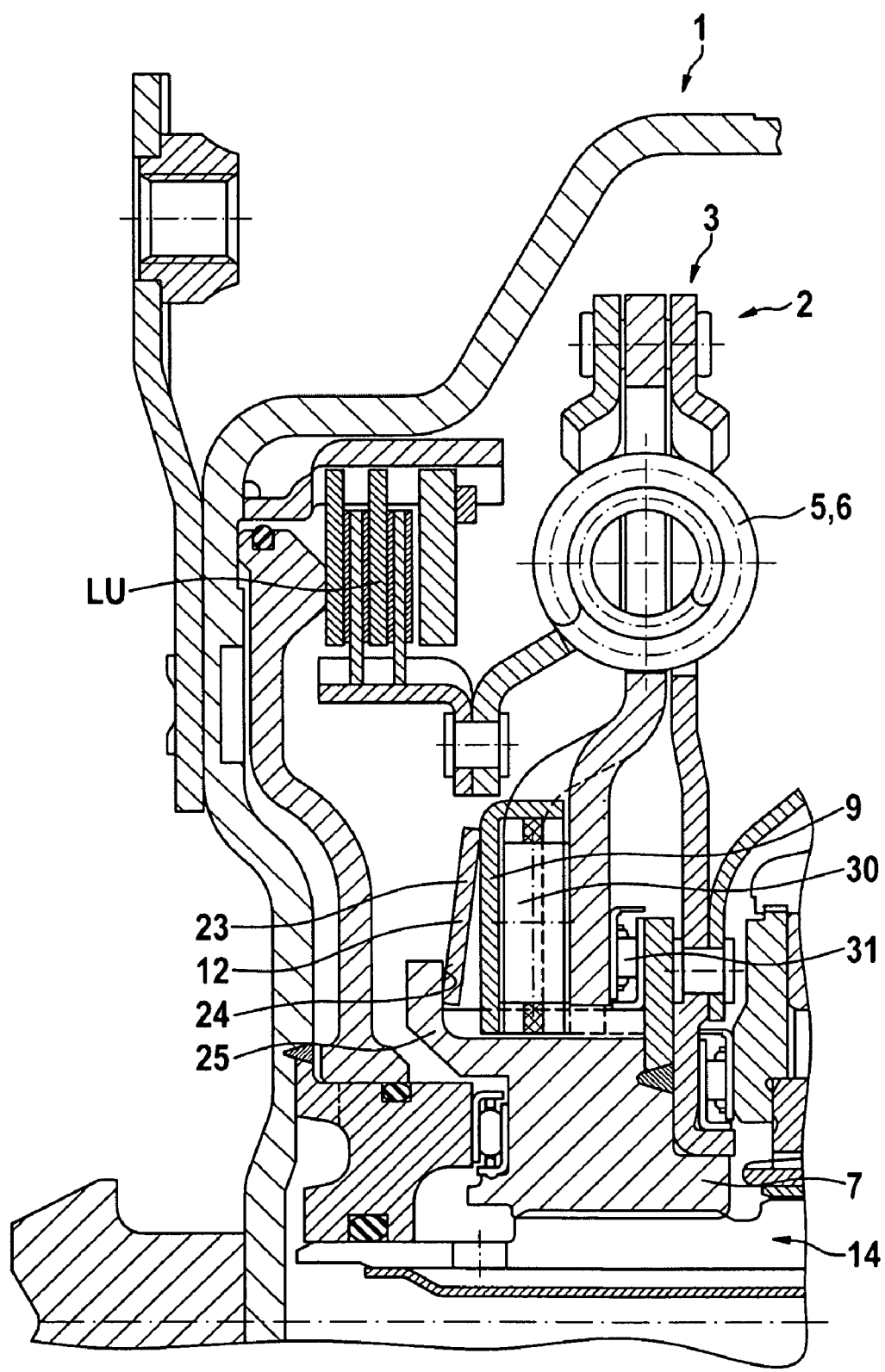
FIG. 5 illustrates a development of FIG. 3 or 4.

FIG. 5 illustrates an embodiment of FIG. 4 where support is provided on both sides, and flange 15 or the ramp-bearing element does not fixedly abut hub 7 but is rather axially movable by support element 31 on the hub, or on an element 27 that is fixedly connected to hub 7.

Instead of the described spring units 12 in the form of diaphragm springs 23, compression springs can be used in all embodiments. The compression springs are pretensioned to press against ramp 8, i.e., they are arranged between the connecting element, especially hub 7 itself and ramp 8 on which they act.

Figure 6:
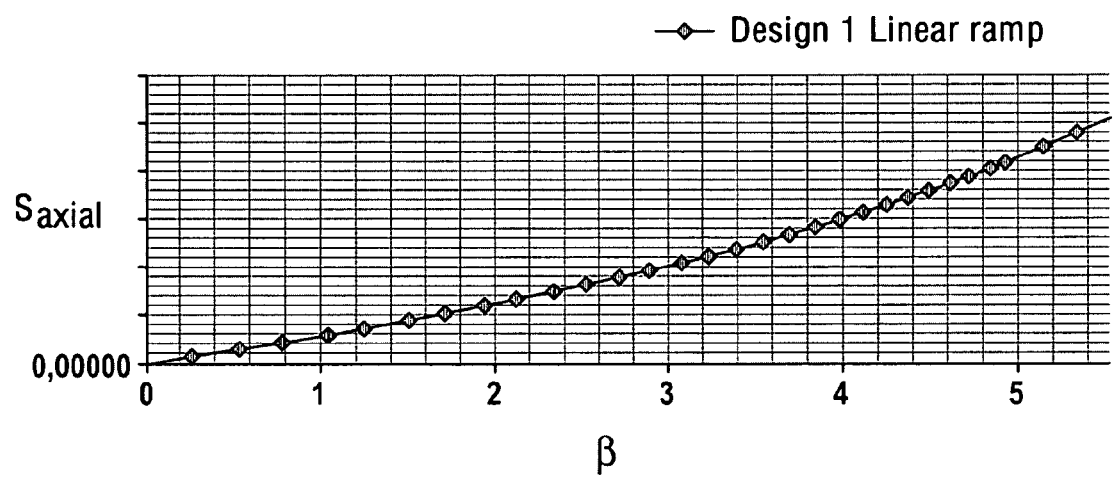
FIG. 6 illustrates a device designed according to the invention to dampen vibrations with reference to a diagram of the damping behavior.

By means of ramp 8, the windup angle of a damper can be increased at a specified torque M within specific sections of a torsion damper characteristic, or the spring rate can be specifically reduced. The torque is applied to the flange 15, and directed from the flange to ramp 8. Counter element 9 or a counter element unit is axially deflected by ramp 8. The axial path of this counter element is resiliently limited by a stop. The stop can have various designs. FIG. 6 shows a diagram to illustrate the characteristic of a target function for the spring rate, i.e., the ratio of the axial displacement path $s_{axial}$ to the windup angle β, that can be influenced by the characteristic of the utilized spring element, especially diaphragm springs 23 or compression springs, and by the characteristic of the ramp slope. In FIG. 6, the designed axial path is plotted as a function of the windup angle. We can see that an approximately linear function results, and the deflection s increases as the windup angle β increases. This can be greatly influenced by the ramp slope, i.e., the amount of axial change of the ramp viewed in the peripheral direction.

The solution according to the invention is shown in individual FIGS. 1 to 5 for a device for damping vibrations 2 by means of mechanical dampening, especially friction damping. Other embodiments are conceivable. In addition, the solution according to the invention can also be used for embodiments with a hydraulic damping principle.

Units according to the invention or devices for damping vibrations can be used in force transmission devices 1 in a known manner. A particularly preferred application is to use the device to damp vibrations 2 in a force transmission device that for example comprises a hydrodynamic component and a device LU to bridge the hydrodynamic component. In the flow of force, device 2 to dampen vibrations can be downstream from both elements and upstream from the output of force transmission device 1, or in a power branch formed by the hydrodynamic component or the bridging device LU, and only act as an absorber in the other power branch.

REFERENCE NUMBERS

1 Force transmission device
2 Device for damping vibrations
3 Primary part
4 Secondary part
5 Means for transmitting torque
6 Means for damping vibrations
7 Hub
8 Ramp
9, 9.1, 9.11, 9.12 Counter element
9.3, 9.4 Counter element
10, 10.1 Ramp plate
10.11, 10.12 Ramp plate
11 Pretensionable unit
12 Spring element
13 Connection element
14 Transmission input shaft
15 Flange
16 Plate element
17 Toothed element
18 Toothed element
19 Inner perimeter
Section
21 Outer perimeter
22 Section
23 Diaphragm spring
23.1, 23.2 Diaphragm spring
24 Contact surface
25 Collar
26 Contact surface
27 Element
28 Ball bearing
29 Plate element
30 Cylindrical roller bearing
31 Compression spring
32 Spring unit
R Rotational axis
S Displacement path β Windup angle
LU Bridging element
M Torque

What is claimed is:

1. A device (2) for damping vibrations comprising at least one primary part (3) and a secondary part (4) that are coaxial in relation to each other and limited rotatably relative to each other in a peripheral direction, whereby the primary part (3) and secondary part (4) are coupled with each other by means (32) for transmitting torque and damping vibrations, and the secondary part (4) includes a flange, and the flange is directly coupled with limited rotational play to a hub that is directly non-rotationally coupled to a transmission input shaft (14), wherein a ramp (8) is provided that is at least indirectly connected to the secondary part (4) and extends axially in a peripheral direction over a section and has an axially changing slope and acts on at least one counter element (9, 9.1, 9.11, 9.12, 9.3, 9.4) mounted so as to be axially displaceable and braced against a connecting element (13) of the hub via a pretensioning unit (11), wherein the pretensioning unit acts to press the counter element axially toward the ramp, and wherein the at least one counter element is axially moveable along the hub and directly non-rotationally coupled to the hub.

2. The device (2) recited in claim 1, wherein the flange (15) is designed as a single part with the secondary part (4).

3. The device (2) recited in claim 1, wherein the flange (15) comprises a single part, and the function of the ramp (8) is integrated in the flange (15).

4. The device (2) recited in claim 1, wherein a counter element (9, 9.1, 9.11, 9.12, 9.3, 9.4) is assigned to each side of the ramp (8) in an axial direction.

5. The device (2) recited in claim 1, wherein a counter element (9, 9.1, 9.11, 9.12) is designed as an element borne by a friction bearing.

6. The device (2) recited in claim 5, wherein the counter element (9, 9.1, 9.11, 9.12) comprises at least one ramp plate (10, 10.1, 10.11, 10.12) that is assigned to the ramp (8) on one side in an axial direction.

7. The device (2) recited in claim 1, wherein the counter element (9.3, 9.4) is designed as an element borne by a roller bearing.

8. The device (2) recited in claim 7, wherein the counter element (9.3, 9.4) comprises at least one ball bearing (28) that is assigned to the ramp (8) in an axial direction.

9. The device (2) recited in claim 7, wherein the counter element (9.3, 9.4) comprises at least one cylindrical roller bearing (30).

10. The device (2) recited in claim 1, wherein the pretensioning unit (11) comprises at least one diaphragm spring (23, 23.1, 23.2).

11. The device (2) recited in claim 1, wherein the connecting element to abut against the pretensioning unit (11) is formed by a hub (7).

12. The device (2) recited in claim 11, wherein the hub (7) is designed as a single part.

13. The device (2) recited in claim 1, wherein the connecting element is formed by a fixed annular flange on said hub.

14. The device (2) recited in claim 1, wherein a damping rate of the device is a function of a slope of the ramp.

15. The device (2) recited in claim 1, wherein the means (32) for transmitting torque and damping vibrations is formed by spring units (32).

16. A force transmission device (1) for use in motor vehicles with one input and at least one output, comprising a hydrodynamic component and a device (LU) for bridging the hydrodynamic component, and at least one device (2) for damping vibration said device for damping vibration comprising at least one primary part (3) and a secondary part (4) that are coaxial in relation to each other and limited rotatably relative to each other in a peripheral direction, whereby the primary part (3) and secondary part (4) are coupled with each other by means (32) for transmitting torque and damping vibrations, and the secondary part (4) includes a flange, and the flange is directly coupled with limited rotational play to a hub that is directly non-rotationally coupled to a transmission input shaft (14), wherein a ramp (8) is provided that is at least indirectly connected to the secondary part (4) and extends axially in a peripheral direction over a section and has an axially changing slope and acts on at least one counter element (9, 9.1, 9.11, 9.12, 9.3, 9.4) mounted so as to be axially displaceable and braced against a connecting element (13) of the hub via a pretensioning unit (11), and wherein the at least one counter element is axially moveable along the hub and directly non-rotationally coupled to the hub.

* * * * *